United States Patent [19]
Stark

[11] Patent Number: 5,408,812
[45] Date of Patent: Apr. 25, 1995

[54] DOG BOOT

[76] Inventor: Rodney W. Stark, 5815 Olive St., Commerce City, Colo. 80022

[21] Appl. No.: 134,643

[22] Filed: Oct. 12, 1993

[51] Int. Cl.6 .............................................. B68C 5/00
[52] U.S. Cl. ......................................... 54/82; 119/850
[58] Field of Search ......................... 54/79.1, 79.2, 82; 168/1, 2, 3; 119/850

[56] References Cited
U.S. PATENT DOCUMENTS

| 65,231 | 5/1867 | Jennings | 168/2 |
| 2,424,172 | 7/1947 | Huddleston | 54/82 X |
| 4,543,911 | 10/1985 | Marshall | 54/82 |
| 5,148,657 | 9/1992 | Stafford et al. | 54/82 |
| 5,209,048 | 5/1993 | Hanson | 168/2 X |

Primary Examiner—Robert P. Swiatek
Attorney, Agent, or Firm—Charles C. Corbin

[57] ABSTRACT

A dog boot for use on a hunting dog, the boot having a lower paw-receiving portion of flexible, moisture-resistent material, and a generally tubular elongate legging portion extending upwardly from the paw-receiving portion, a vertical slit in the legging portion providing first and second overlappable flap portions, and a buckle-equipped securing strap at the lower part and at the upper part of the legging portion, the boot securable to the leg to provide protection as well as buoyancy, shock absorbency and thermal insulation.

5 Claims, 1 Drawing Sheet

DOG BOOT

BACKGROUND OF THE INVENTION

1. Field of the Invention

The present invention relates to protective wear for the feet of canines, and more particularly to a protective boot for the paws and legs of a hunting dog.

2. Description of the Prior Art

The prior art shows a variety of devices for protecting the feet and legs of animals such as dogs. Examples are shown in U.S. Pat. No. 4,457,261, 4,458,431, 2,651,853, and 2,535,394. Unfortunately, while these prior art boots, and such devices as are currently available, may prove useful in protecting one's pet during casual dog-walking activities, such as along sidewalks, and through parks, they lack in meeting the more stringent requirements of the hunting dog.

When a dog is used in the field for activities such as hunting and retrieving, the feet and legs of the animal are susceptible to a number of hazards. Harsh terrain, and thorns and burrs can lead to painful, sore paws, and running through underbrush can often subject the animal's legs to scraping, cuts, and abrasion. Additional hazards confront the dog when he hunts in cold weather, and in wet conditions where exposure of the dog's feet and legs can lead to discomfort stiffening of the joints, and excessive chilling. Dogs that are kept primarily as domestic pets for most of the year are particularly susceptible to such injury and harm in the field. Once particular problem encountered with currently available dog boots is the tendency for them to come off despite being equipped with adhesive ties, and Velcro fasteners. Sometimes additional adhesive tape can be used for additional security, but exposure to moisture can quickly deteriorate the adhesive bond, and when adhesive tape is applied to the dog's leg it can be difficult and painful to remove. It is also noted that Velcro-equipped straps can be knocked loose by collisions with the underbrush. Prior devices also appear to be quite limited in their ability to protect the leg, including joints, from physical abrasion as well as the cold and wet environment.

SUMMARY OF THE INVENTION

In view of the foregoing it is a general object of the present invention to provide an improved dog boot.

Another object of the invention is to provide a dog boot that will not come off under the rigors of hunting activities.

Yet another object of the invention is to provide such a dog boot that will absorb the shock of impacts to the dog's leg.

A further object is to provide such a protective boot that will insulate a substantial portion of the leg against cold weather.

A still further object is to provide a dog boot that provides increased buoyancy as well as warmth to the animal when it is immersed in water.

These and other objects and advantages are provided by a dog boot according to the present invention, which boot includes a paw-covering portion of flexible moisture-resistent woven polymeric material, including a top, bottom and sides, the boot including a tubular elongate legging portion that extends upwardly from the paw-covering portion, there being a longitudinal slit extending upwardly along the front of the legging portion to provide adjacent, opposite, overlapping flap portions that are equipped with hook and loop fastening material. There is an adjustable strap that is securable about the periphery of the lower end of the legging portion for gathering the legging against the leg of the dog, and a second such adjustable strap is provided on the upper part of the legging portion. The legging portion is flexible, resilient, thermally insulative, and buoyant, and the boot has a secured position in which the legging portion resiliently embraces the dog leg and is effective to protect the foot and leg against moisture and abrasion, and to thermally insulate the leg and to absorb shock to the leg.

DETAILED DESCRIPTION OF THE INVENTION

Figure 1:
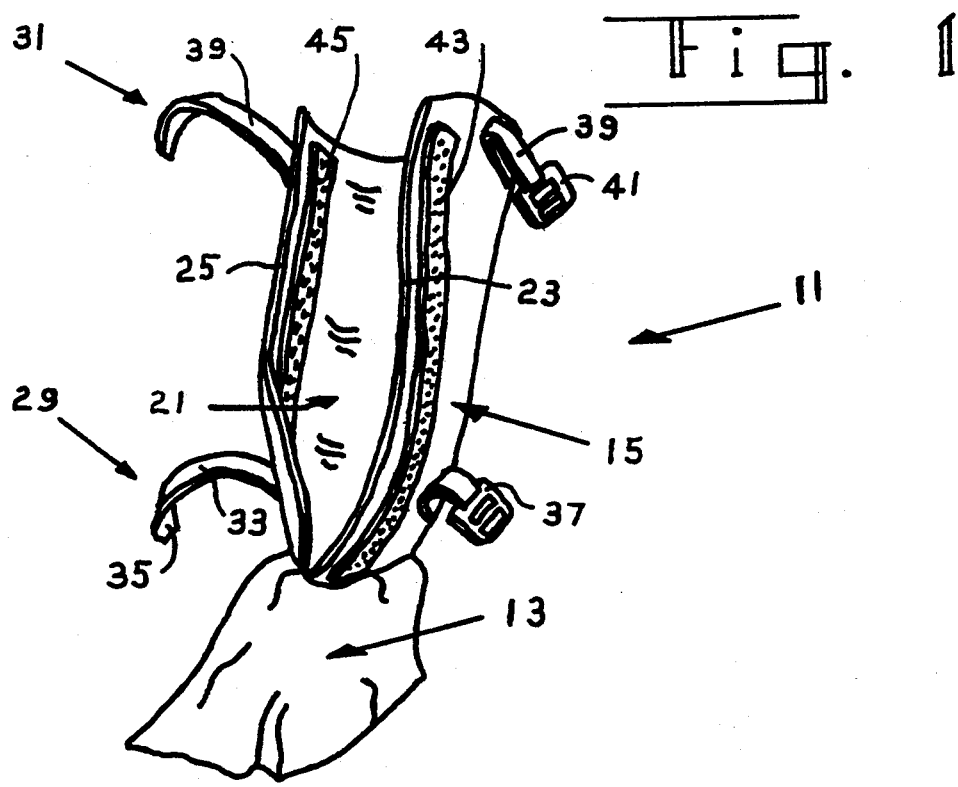
FIG. 1 is a perspective view illustrating a dog boot according to the present invention.

Referring now to the drawings, FIG. 1 shows that a dog boot 11, according to the present invention, comprises a paw-receiving portion 13, and a legging portion 15.

The paw-receiving portion 13 is fashioned from a suitable durable, flexible, water repellent fabric using conventional commercial stitching and sealing techniques and is shaped to receive the dog's paw region, including the region just above the paw adjoining the metatarsus or the metacarpus. Thus the paw-receiving portion 13 is shaped to receive what is informally described as the dog's foot and ankle. The preferred embodiment herein described employs a woven nylon fabric that is provided with a polyurethane coating for waterproofing, such fabric being commercially available under the trademark Cordura nylon. It is preferred that a double layer of this material be incorporated in the bottom 17 and the back portion 19 of the paw-receiving portion 13 to give added protection for the bottom of the paw and the heel.

The lower end of portion 15 is firmly secured to the upper part of portion 13 using stitching or other suitable means. The legging portion 15 has a generally tubular configuration with a longitudinal slit extending from the top of portion 13 to provide a marginal edge flap 23 and an opposing marginal edge flap 25, which flaps can be positioned in overlapping relationship when portion 15 is mounted over a dog's leg in a manner to be described. Legging portion 15 is sufficiently long to extend above the tarsus of the hind legs, and the carpus of the front legs of a dog. Portion 15 is made of a closed cell expanded rubber-like material which, unlike portion 15, is stretchable and elastic so as to allow the legging portion 23 to snugly and resiliently embrace the leg of the dog when applied, as will be described. This material is also chosen for ability to cushion and absorb shock, as well as to thermally insulate. Such material has the further advantage of being substantially buoyant. Such a suitable material is a neoprene, and one commercial source is the Rubatex Corporation of Bedford, Virginia.

Figure 2:
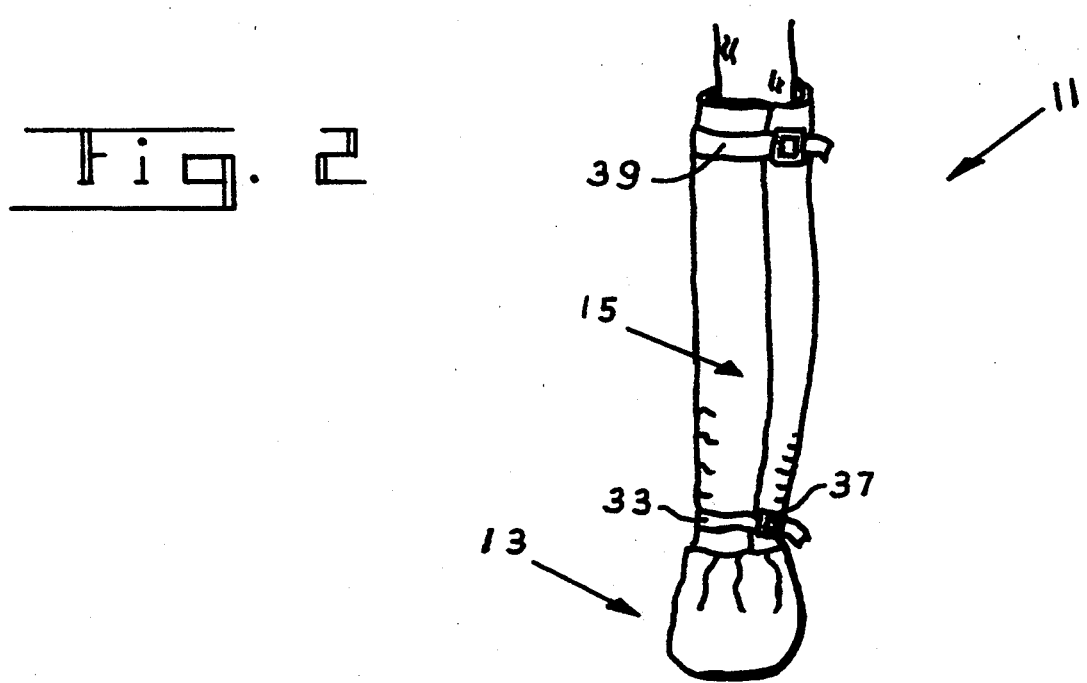
FIG. 2 is a front elevational view showing the secured position of a boot according to the present invention to the leg of a dog.

FIGS. 1 and 2 show that boot 11 further includes an adjustable fastening strap member 29 attached to the lower part of portion 15, and a second strap member 31, attached near the upper end of portion 15. Member 29 includes a nylon strap 33 which is attached by stitching to portion 15 and has a free end 35 and an opposite end to which is secured a conventional buckle 37 that is designed to be engaged by the free end 35 to positively and releasably secure strap 33. Member 31 similarly has a nylon strap 39 secured to portion 15, and is equipped with buckle 41, like the buckle 37. Note that a first Velcro strip 43 is secured to the outside of the flap portion 23, and a complementary Velcro strip 45 is secured to the inside of flap 25. The dimensions of the legging portion 15 are chosen such that when boot 11 is applied to a dog's leg, the portion 15 can be wrapped snugly around the leg, the flap 25 overlapping the flap 23 and secured in this position by virtue of the engaged Velcro strips. To further secure the boot to the leg, strap 33 is engaged through the buckle 37 and drawn therethrough in order the gather the legging material in firmly against the dog's leg. Strap 33 is then secured. Similarly the strap 39 is drawn through buckle 41 so as to gather the upper part of legging 15 in against the dogs leg at a region above the tarsus or the carpus. Thus when boot 11 is mounted as illustrated in FIG. 2 the paws, and a substantial portion of the dog's leg, are well protected against hazards of the hunting environment, portion 13 protecting the feet and portion 15 cushioning the leg against blows, keeping the joints, muscles and tendons warm in cold weather, and enhancing the total buoyancy of the animal when it must swim.

While a particular preferred embodiment of the invention has been described it is intended that the invention not be limited thereto, but be given a full scope and breadth as defined in the claims which follow.

What is claimed is:

1. A boot for covering the paw and lower leg of the limbs of a dog, said boot including:
    a. a paw-enclosing portion comprised of a flexible, water-repellent woven material including a bottom, sidewalls and a top wall;
    b. a generally tubular, elongate legging portion, extending upwardly from said paw-enclosing portion, said legging portion having a longitudinally extending closable slit in the front of said legging portion, said slit bounded by oppositely disposed first and second overlappable marginal flap portions and said legging portion comprised of a flexible, non-woven thermally insulative, waterproof, shock-absorbent, and buoyant material and each of said flap portions terminating in a longitudinally-extending free edge that terminates at said paw-enclosing position; and
    c. a first adjustable strap fastening means adjacent the upper part of said paw-enclosing portion, and a second adjustable strap fastening means attached to the upper part of said legging portion whereby when the dog's paw and leg are received in said boot, said legging portion is capable of a fastened position in which said flap portions are in overlapped relationship, and said legging portion resiliently embraces said leg and is effective to cushion and protect said leg against impact, to thermally insulate said leg and to increase the buoyancy of said dog.

2. A dog boot as defined in claim 1 wherein said legging portion is constructed of a lightweight closed cell expanded rubber-type material.

3. A boot as defined in claim 1 wherein said first and second adjustable strap fastening means include positively locking buckle mechanisms.

4. A boot as defined in claim 3 including hook and loop fastening means on said marginal flap portions for holding said flaps engaged in overlapped relationship.

5. A dog boot as defined in claim 1 wherein said first adjustable strap fastening means effective for gathering the lower part of said legging against the metatarsus or metacarpus of the dog leg, and said second adjustable strap fastening means is for gathering the upper part of said legging against the dog leg above the parsus or the carpus of the leg.

* * * * *